(12) United States Patent
Hsu et al.

(10) Patent No.: US 12,340,230 B2
(45) Date of Patent: Jun. 24, 2025

(54) NETWORK-CONNECTED BOOT DEVICE CONNECTION REFRESH SYSTEM

(71) Applicant: Dell Products L.P., Round Rock, TX (US)

(72) Inventors: Shengwei Hsu, Taipei (TW); Yu-Heng Liu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 216 days.

(21) Appl. No.: 18/137,601

(22) Filed: Apr. 21, 2023

(65) Prior Publication Data

US 2024/0354119 A1    Oct. 24, 2024

(51) Int. Cl.
*G06F 9/4401* (2018.01)
(52) U.S. Cl.
CPC .......... *G06F 9/4416* (2013.01); *G06F 9/4403* (2013.01)
(58) Field of Classification Search
CPC .............................. G06F 9/4416; G06F 9/4403
See application file for complete search history.

(56) References Cited

U.S. PATENT DOCUMENTS

| 11,265,092 | B2 | 3/2022 | Wang | |
| 11,321,077 | B1* | 5/2022 | Sakthikumar | G06F 8/656 |
| 2003/0120827 | A1* | 6/2003 | Fulginiti | G06F 8/61 |
| | | | | 719/319 |
| 2004/0078679 | A1* | 4/2004 | Cagle | G06F 9/4406 |
| | | | | 714/36 |

OTHER PUBLICATIONS

US National Security Agency, UEFI Advantages Over Legacy Mode, Mar. 2018 (Year: 2018).*

* cited by examiner

*Primary Examiner* — Kim Huynh
*Assistant Examiner* — Cole Jiawei Wentzel
(74) *Attorney, Agent, or Firm* — Joseph Mencher

(57) ABSTRACT

A network-connected boot device connection refresh system includes a computing device that is coupled to a boot device via a network, and that includes an initialization subsystem. As part of an initialization of the computing device, the initialization subsystem performs first network-level connection operations that do not result in a connection to the boot device. If the initialization subsystem then determines that a boot device connection refresh should be performed, it performs Unified Extensible Firmware Interface (UEFI)-level reconnection operations followed by second network-level connection operations that result in a connection to the boot device, and provides the boot device as an option for completing the initialization of the computing device.

20 Claims, 14 Drawing Sheets

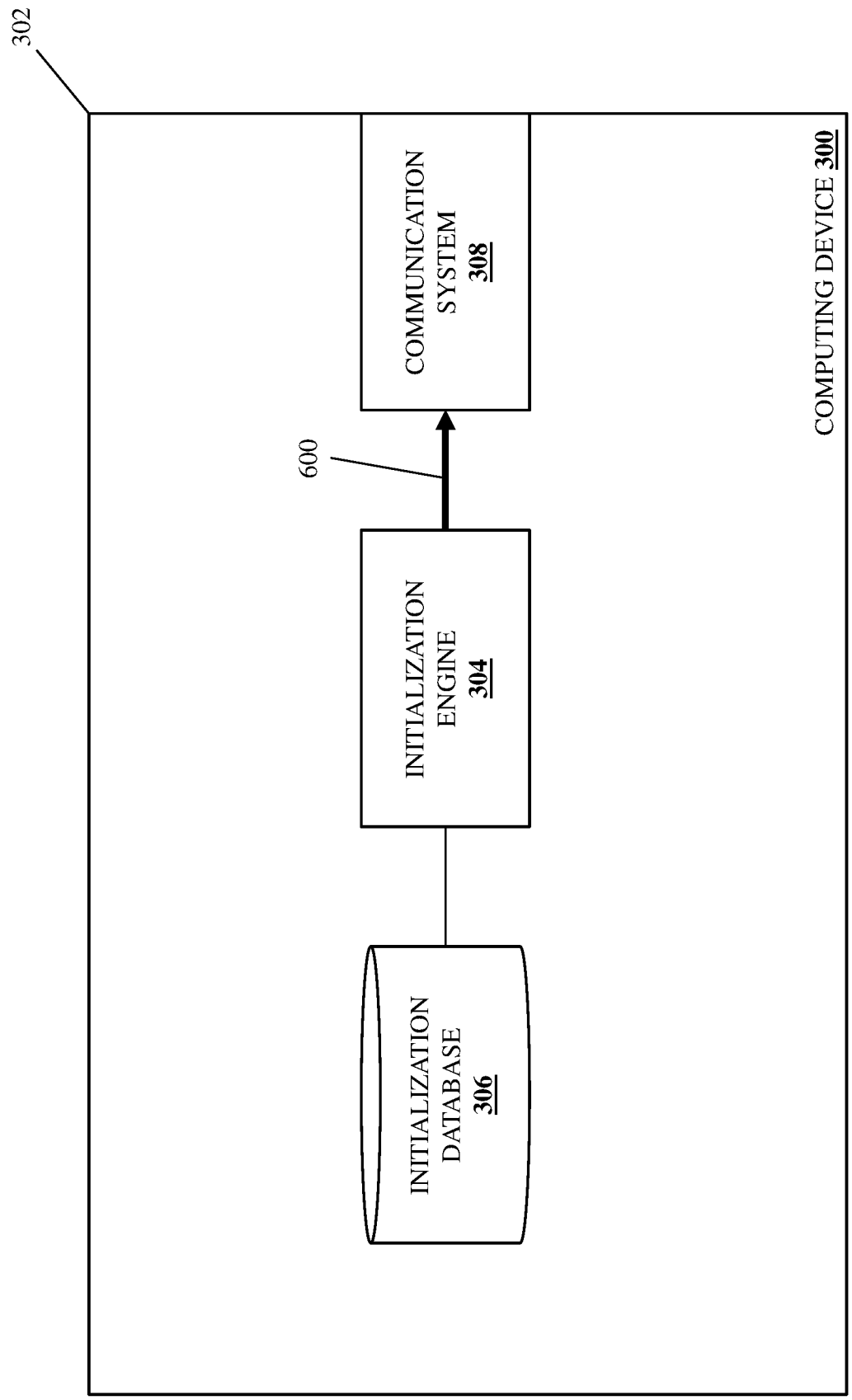

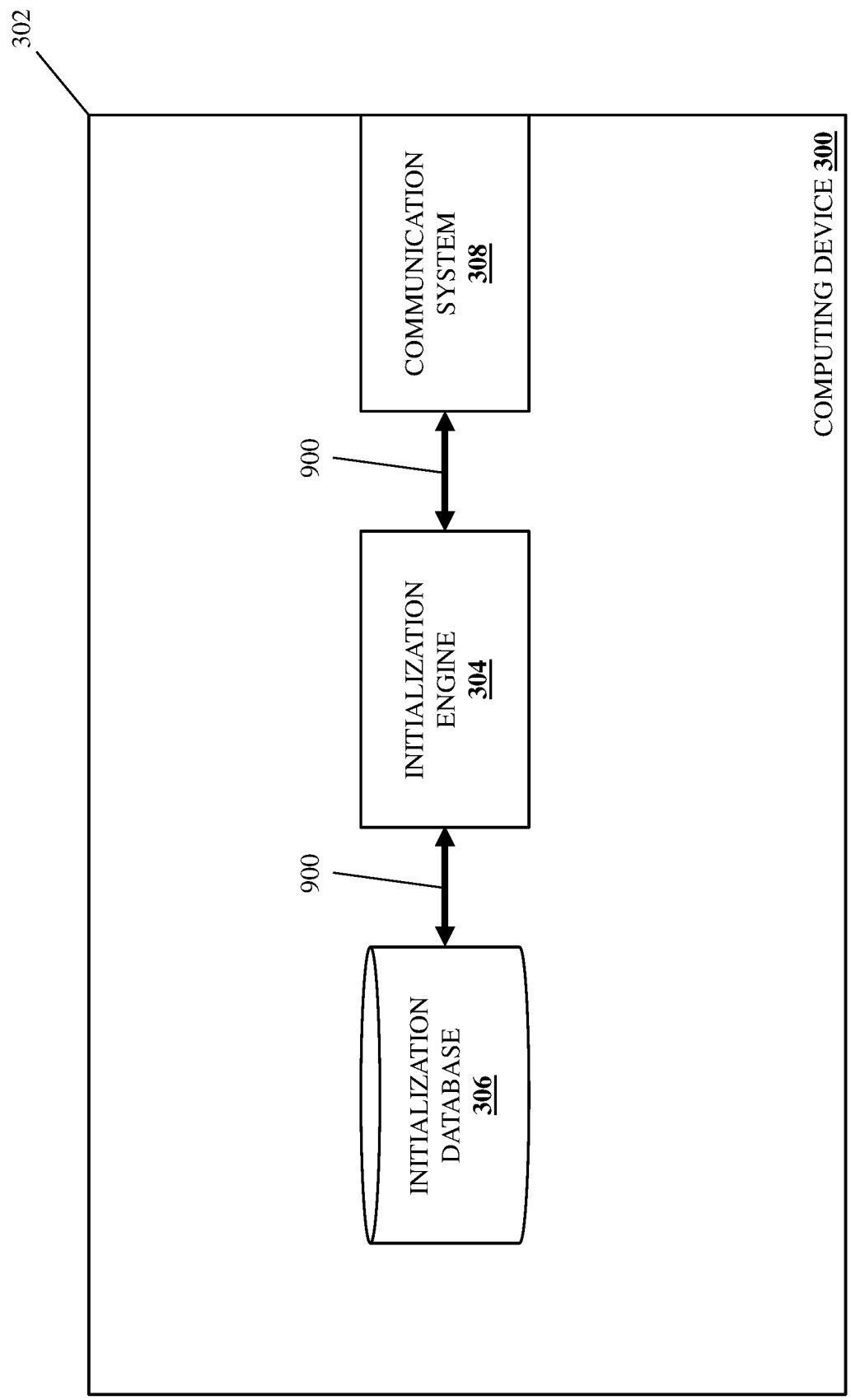

NETWORK-CONNECTED BOOT DEVICE CONNECTION REFRESH SYSTEM

BACKGROUND

The present disclosure relates generally to information handling systems, and more particularly to refreshing the connection of network-connected boot devices for an information handling system without requiring reboot of the information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, sometimes perform initialization operations using boot devices that are connected to the computing device via a network. For example, some server devices perform initialization operation using boot information stored on internet Small Computer Systems Interface (iSCSI) storage devices, Non-Volatile Memory express (NVMe) over Fabrics (NVMe-oF) storage devices, and/or other storage devices that may be connected to the server device via a network. However, the use of such network-connected storage devices for initialization operations can raise issues.

For example, conventional Basic Input/Output Systems (BIOSs), Unified Extensible Firmware Interface (UEFI) systems, or other initialization systems provided in server devices are configured to perform network-level connection operations for the server device only once during a Power-On Self-Test (POST), and if the network-connected storage device and/or network-connected storage device provider is not available when the initialization system in the server device performs the network-level connection operations (e.g., an iSCSI storage device service or NVMe-OF storage device service is offline or disabled), the initialization system in the server device will not have access to that network-connected storage device and may be unable to complete the initialization operations. In another example, a user may wish to reconfigure a network-connected storage device during the initialization operations described above. In either situation, the conventional BIOS will require a reboot of the server device in order to reattempt the network-level connection operations to connect to the previously-unavailable network-connected storage device or reconfigured network-connected storage device, which one of skill in the art will appreciate is a time-consuming process that delays the availability of the server device.

Accordingly, it would be desirable to provide a network-connected boot device initialization system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an initialization engine that is configured to: perform first network-level connection operations that do not result in a connection to a boot device; determine that a boot device connection refresh should be performed; perform, in response to determining that the boot device connection refresh should be performed, Unified Extensible Firmware Interface (UEFI)-level reconnection operations; perform, in response to performing UEFI-level reconnection operations, second network-level connection operations that result in a connection to the boot device; and provide the boot device as an option for completing the initialization of the computing device.

BRIEF DESCRIPTION OF THE DRAWINGS

FIG. 6A is a schematic view illustrating an embodiment of the operation of the computing device of FIG. 3 during the method of FIG. 4.

FIG. 9A is a schematic view illustrating an embodiment of the operation of the computing device of FIG. 3 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
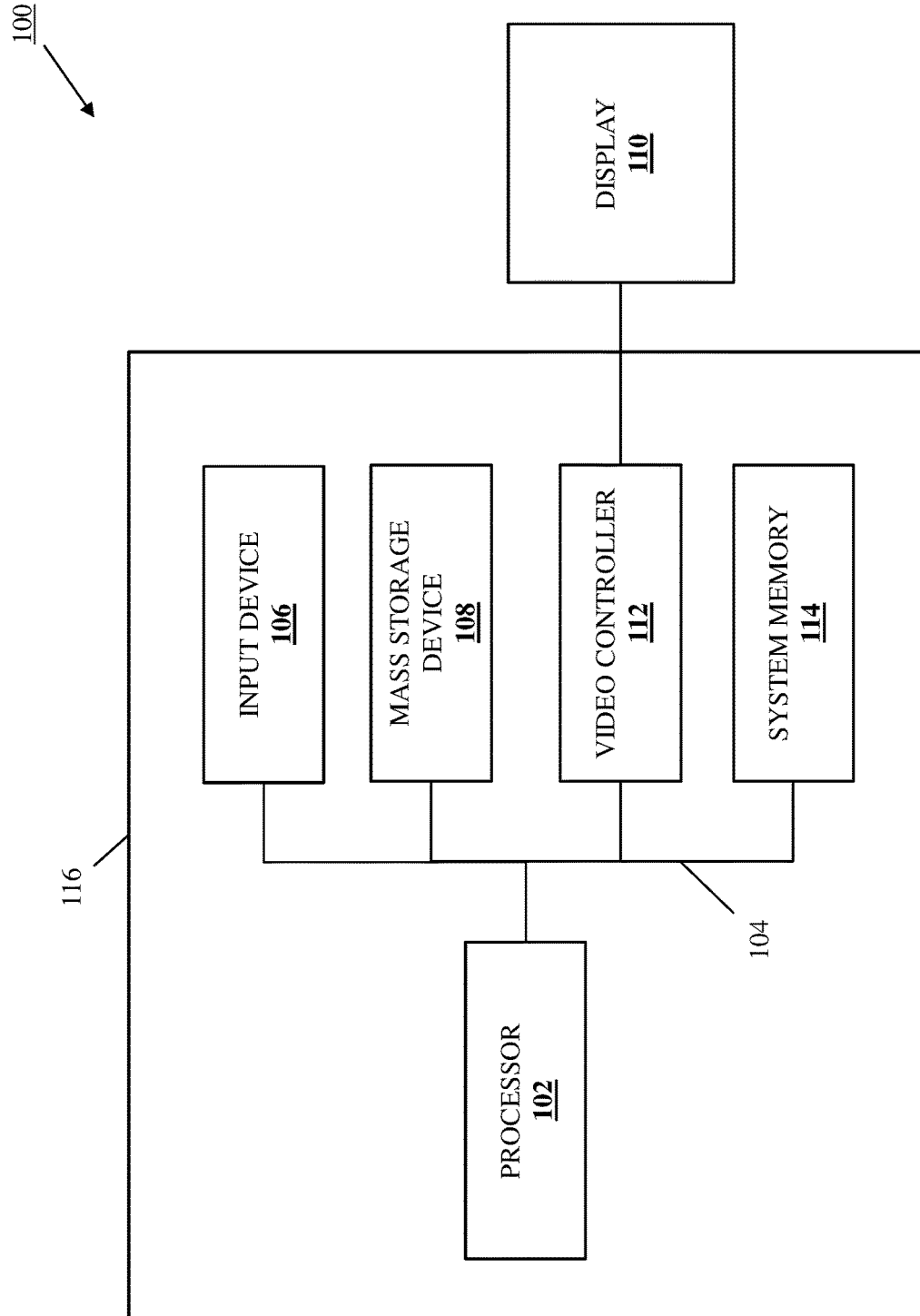
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
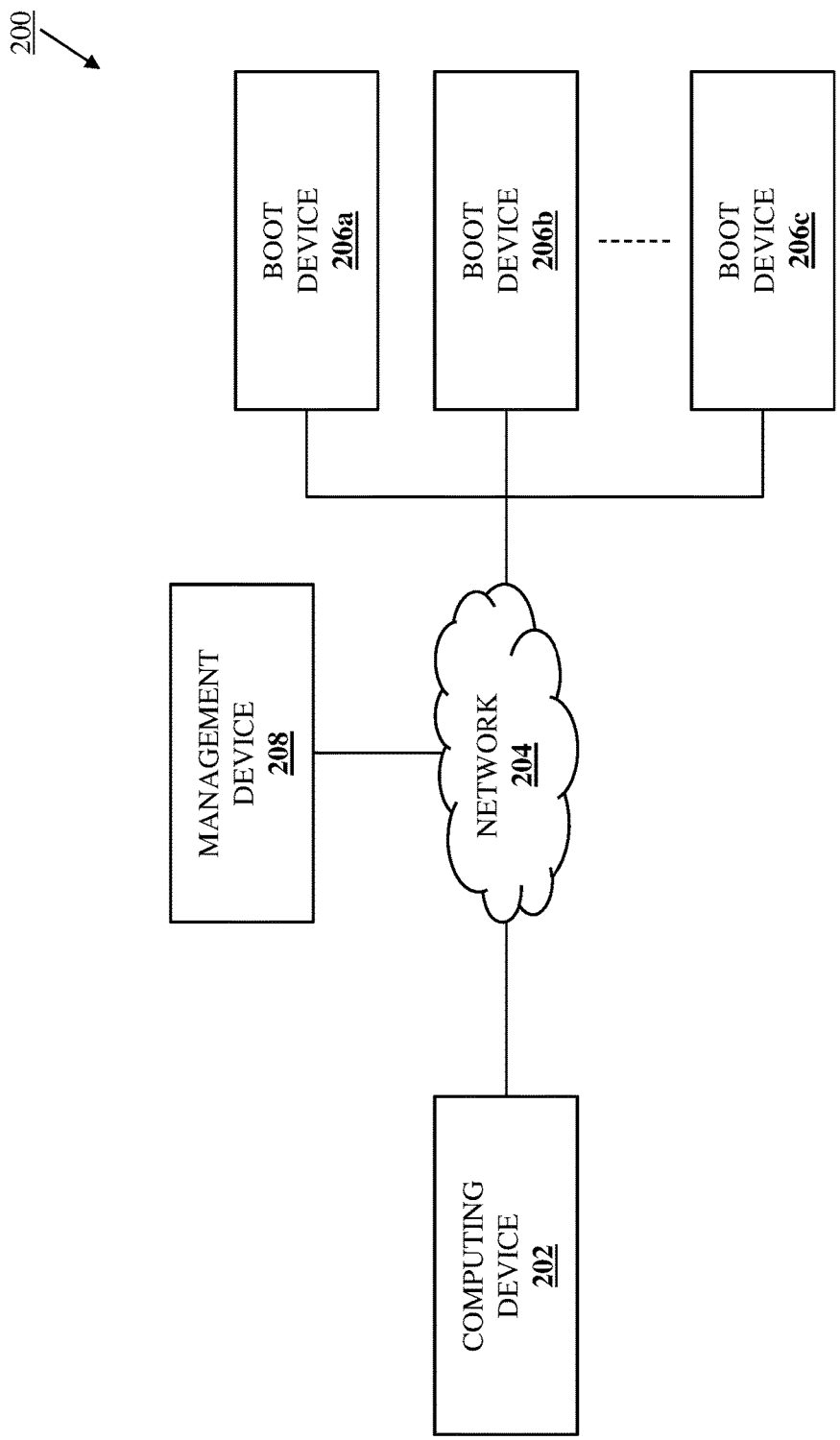
FIG. 2 is a schematic view illustrating an embodiment of a networked system that may include the network-connected boot device connection refresh system of the present disclosure.

Referring now to FIG. 2, an embodiment of a networked system 200 is illustrated that may include the network-connected boot device connection refresh system of the present disclosure. In the illustrated embodiment, the networked system 200 includes a computing device 202. In an embodiment, the computing device 202 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other computing devices known in the art. However, while illustrated and discussed as being provided by particular computing devices, one of skill in the art in possession of the present disclosure will recognize that computing devices provided in the networked system 200 may include any devices that may be configured to operate similarly as the computing device 202 discussed below.

The computing device 202 is coupled to a network 204 that may be provided by a Local Area Network (LAN), the Internet, combinations thereof, and/or any other networks that would be apparent to one of skill in the art in possession of the present disclosure. As illustrated, a plurality of boot devices 206*a*, 206*b*, and up to 206*c* may be coupled to the network 204, with the specific examples provided below including an internet Small Computer Systems Interface (iSCSI) storage device and/or a Non-Volatile Memory express (NVMe) storage device (e.g., an NVMe over Fabric (NVMe-oF) storage device). While not illustrated, one of skill in the art in possession of the present disclosure will appreciate how any of the boot devices 206*a*-206*c* may be provided in one or more computing devices (e.g., server devices, storage systems, etc.) while remaining within the scope of the present disclosure. However, while specific boot devices are illustrated and described, one of skill in the art in possession of the present disclosure will appreciate how any of a variety of network-connected boot devices will benefit from the teachings of the present disclosure and thus will fall within its scope as well.

In the illustrated embodiment, a management device 208 is coupled to the network 204. For example, the management device 208 may be provided by the IHS 100 discussed above with reference to FIG. 1, and/or may include some or all of the components of the IHS 100, and in specific examples may be provided by desktop computing devices, laptop/notebook computing devices, tablet computing devices, mobile phones, and/or other computing devices that one of skill in the art in possession of the present disclosure would recognize as providing for the management of other computing devices. However, while the management device 208 is illustrated and described below as being coupled to the computing device 202 via a network 204, one of skill in the art in possession of the present disclosure will appreciate how the management devices may be directly connected (e.g., via a cable, via a direct wireless connection, etc.) to the computing device 202 to provide the management functionality described below while remaining within the scope of the present disclosure as well. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
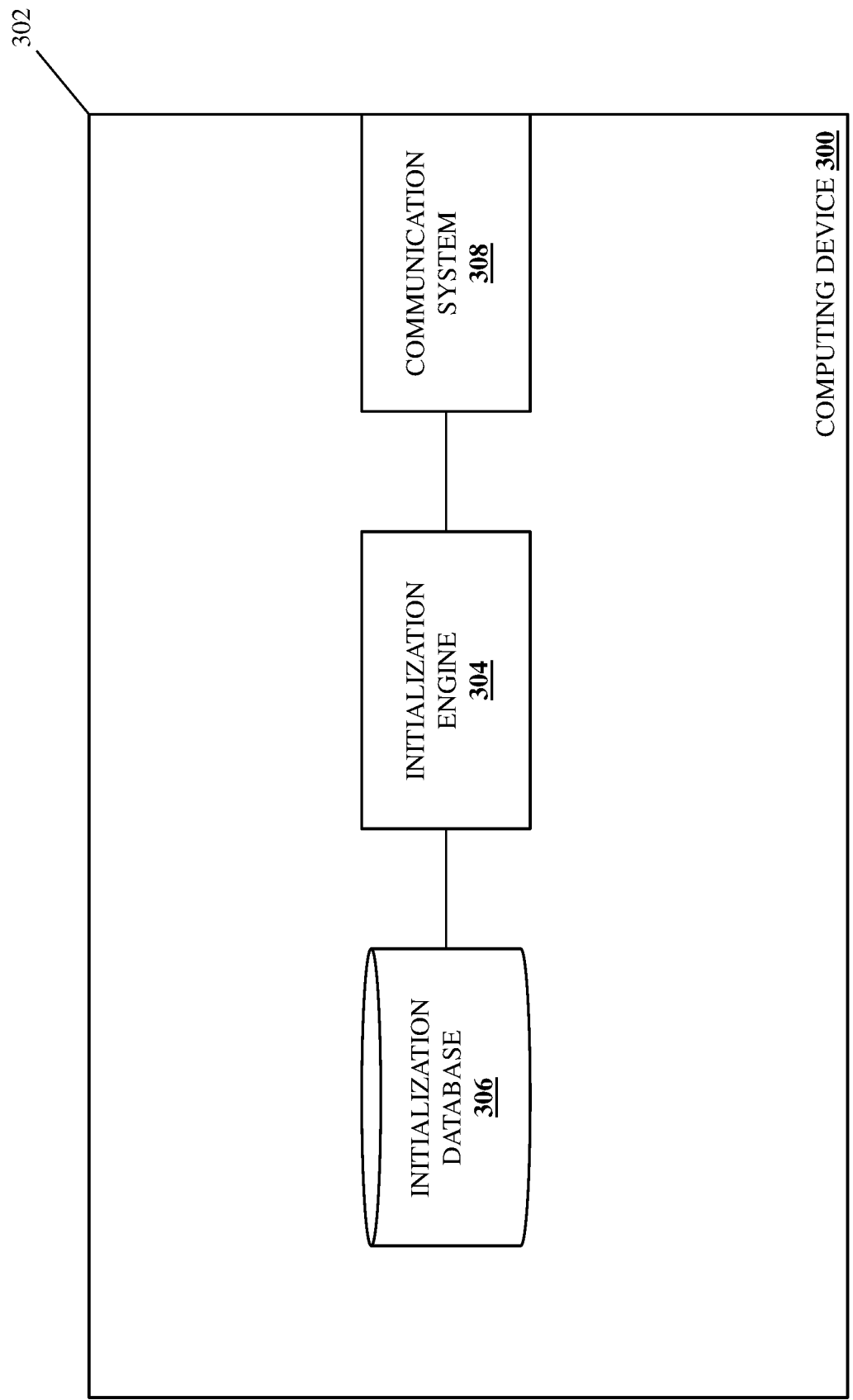
FIG. 3 is a schematic view illustrating an embodiment of a computing device that may be included in the networked system of FIG. 2 and may provide the network-connected boot device connection refresh system of the present disclosure.

Referring now to FIG. 3, an embodiment of a computing device 300 is illustrated that may provide the computing device 202 discussed above with reference to FIG. 2, and that may include the network-connected boot device connection refresh system of the present disclosure. As such, the computing device 300 may be provided by the IHS 100 discussed above with reference to FIG. 1 and/or may include some or all of the components of the IHS 100, and in specific examples may be provided by server devices, desktop computing devices, laptop/notebook computing devices, tablet computing devices, mobile phones, and/or other computing devices known in the art. Furthermore, while illustrated and discussed as being provided by specific computing devices, one of skill in the art in possession of the present disclosure will recognize that the functionality of the computing device 300 discussed below may be provided by other devices that are configured to operate similarly as the computing device 300 discussed below.

In the illustrated embodiment, the computing device 300 includes a chassis 302 that houses the components of the computing device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an initialization engine 304 that is configured to perform the functionality of the initialization engines, initialization subsystems, and/or computing devices discussed below.

In a specific example, the initialization engine 304 may be provided by Basic Input/Output System (BIOS) firmware that is configured to perform hardware initialization during an initialization process (also called a booting process) of the computing device 300, as well as runtime services for an operating system provided by the computing device 300. Furthermore, as described below, the BIOS firmware used to provide the initialization engine 304 may be provided with (or replaced by) a Unified Extensible Firmware Interface (UEFI) engine provided according to the UEFI specification that defines the architecture of platform firmware used for initialization/booting, as well as the interface for interaction with the operating system. However, while specific examples of the initialization engine 304 have been described, one of skill in the art in possession of the present disclosure will appreciate how the initialization engine 304 may be provided in a variety of manners that will fall within the scope of the present disclosure as well.

The chassis 302 may also house a storage system (not illustrated, but which may include the storage 108 discussed above with reference to FIG. 1) that is coupled to the initialization engine 304 (e.g., via a coupling between the storage system and the processing system) and that includes an initialization database 306 that is configured to store any of the information utilized by the initialization engine 304 discussed below. For example, the initialization storage system/initialization database 306 may be included in the BIOS/UEFI firmware described above, although the provisioning of the initialization storage system/initialization database 306 using other storage elements is envisioned as falling within the scope of the present disclosure as well.

The chassis 302 may also house a communication system 308 that is coupled to the initialization engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the network-connected boot device connection refresh functionality discussed below, while remaining within the scope of the present disclosure as well.

Figure 4:
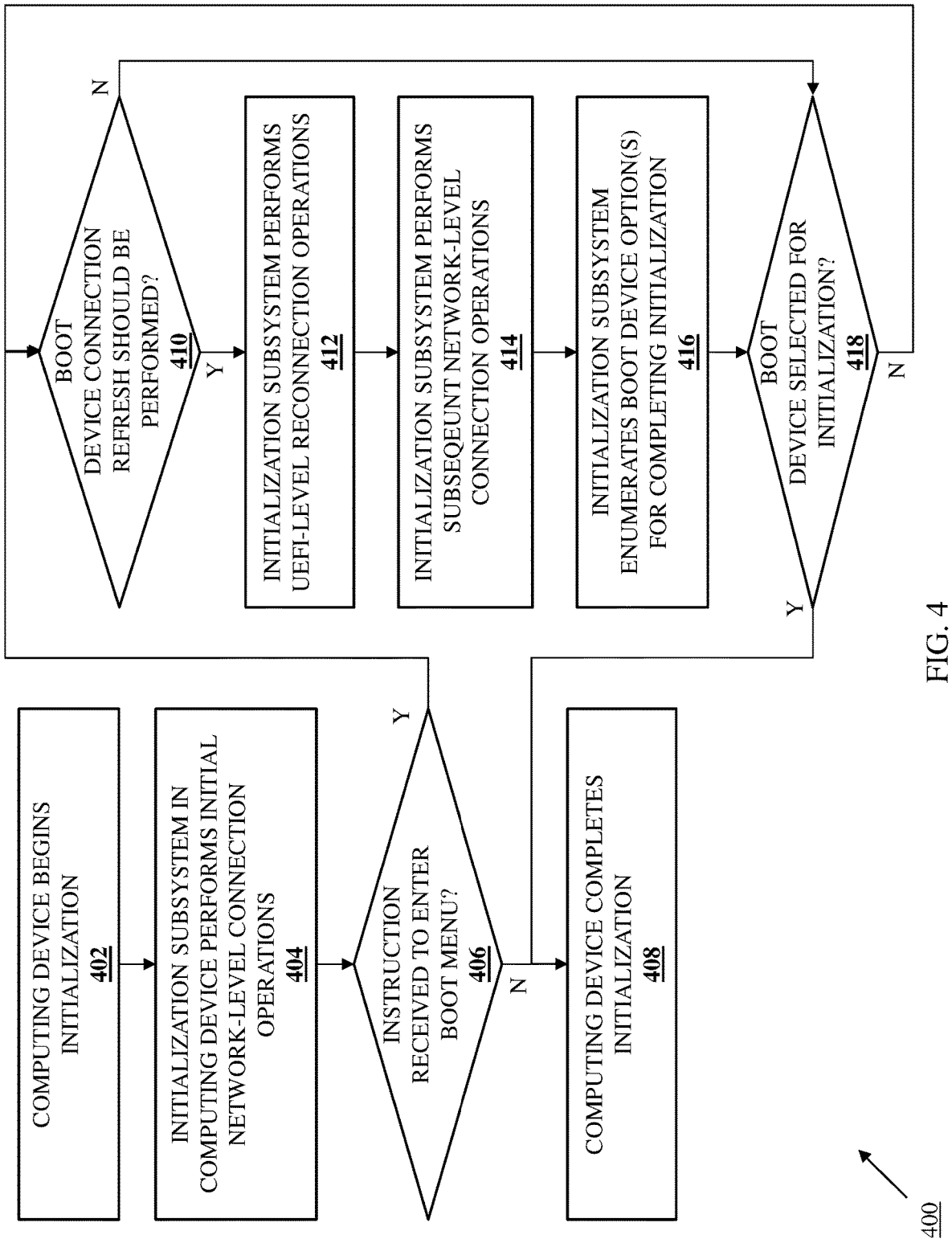
FIG. 4 is a flow chart illustrating an embodiment of a method for refreshing the connection of network-connected boot devices for a computing device.

Referring now to FIG. 4, an embodiment of a method 400 for refreshing the connection of network-connected boot devices for a computing device is illustrated. As discussed below, the systems and methods of the present disclosure provide for "refreshing" of the connection between a computing device and a network-connected boot device during initialization of that computing device and without the need for a reboot. For example, the network-connected boot device connection refresh system of the present disclosure may include a computing device that is coupled to a boot device via a network, and that includes an initialization subsystem. As part of an initialization of the computing device, the initialization subsystem performs first network-level connection operations that do not result in a connection to the boot device. If the initialization subsystem then determines that a boot device connection refresh should be performed, it performs Unified Extensible Firmware Interface (UEFI)-level reconnection operations followed by second network-level connection operations that result in a connection to the boot device, and provides the boot device as an option for completing the initialization of the computing device. As such, boot devices that become available to the computing device subsequent to first network-level connection operations performed during initialization of the computing device may be connected to via second network-level connection operations performed during that initialization of the computing device, eliminating the need to reboot the computing device in order to connect to a boot device that was unavailable during initial network-level connection operations, as occurs in conventional computing devices.

The method 400 begins at block 402 where a computing device begins initialization. In an embodiment, at block 402, the computing device 202/300 may be powered on, reset, or otherwise caused to begin initialization operations such as a Power-On Self-Test (POST) and/or any of a variety of other initialization/boot operations that would be apparent to one of skill in the art in possession of the present disclosure. In some examples, a user of the management device 208 may use the management device 208 to cause the computing device to begin initialization (e.g., via the network 204 as illustrated, via a direct connection between the management device 208 and the computing device 202, etc.), although other techniques for beginning initialization of the computing device 202/300 will fall within the scope of the present disclosure as well. As will be appreciated by one of skill in the art in possession of the present disclosure, the operations and/or other functionality performed during the blocks of the method 400 discussed below will subsequently be performed as part of the initialization of the computing device 202/300 that begins at block 402 and ends at block 408 without the need to reset, reboot, and/or otherwise begin another initialization of the computing device 202/300.

Figure 5A:
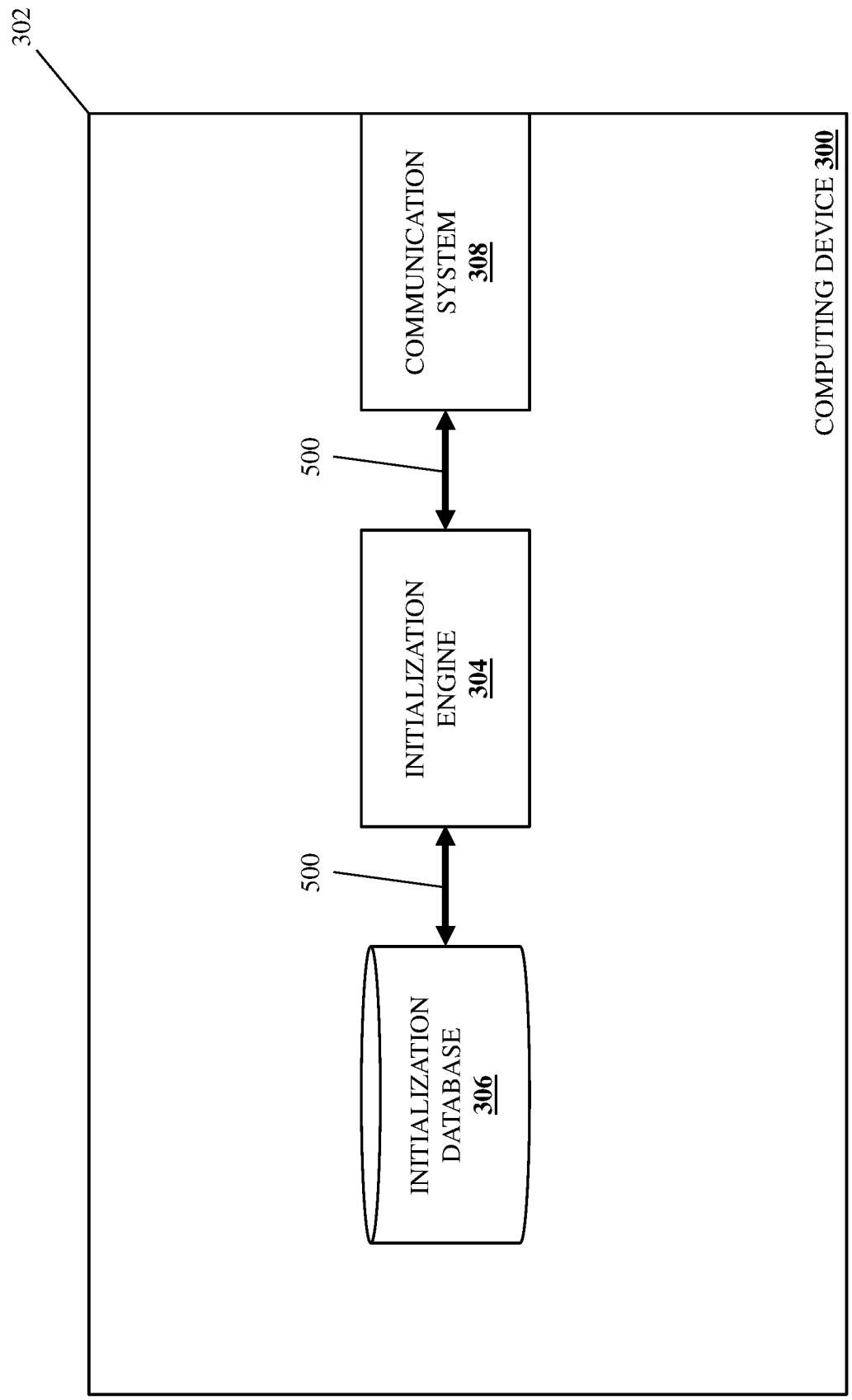
FIG. 5A is a schematic view illustrating an embodiment of the operation of the computing device of FIG. 3 during the method of FIG. 4.
Figure 5B:
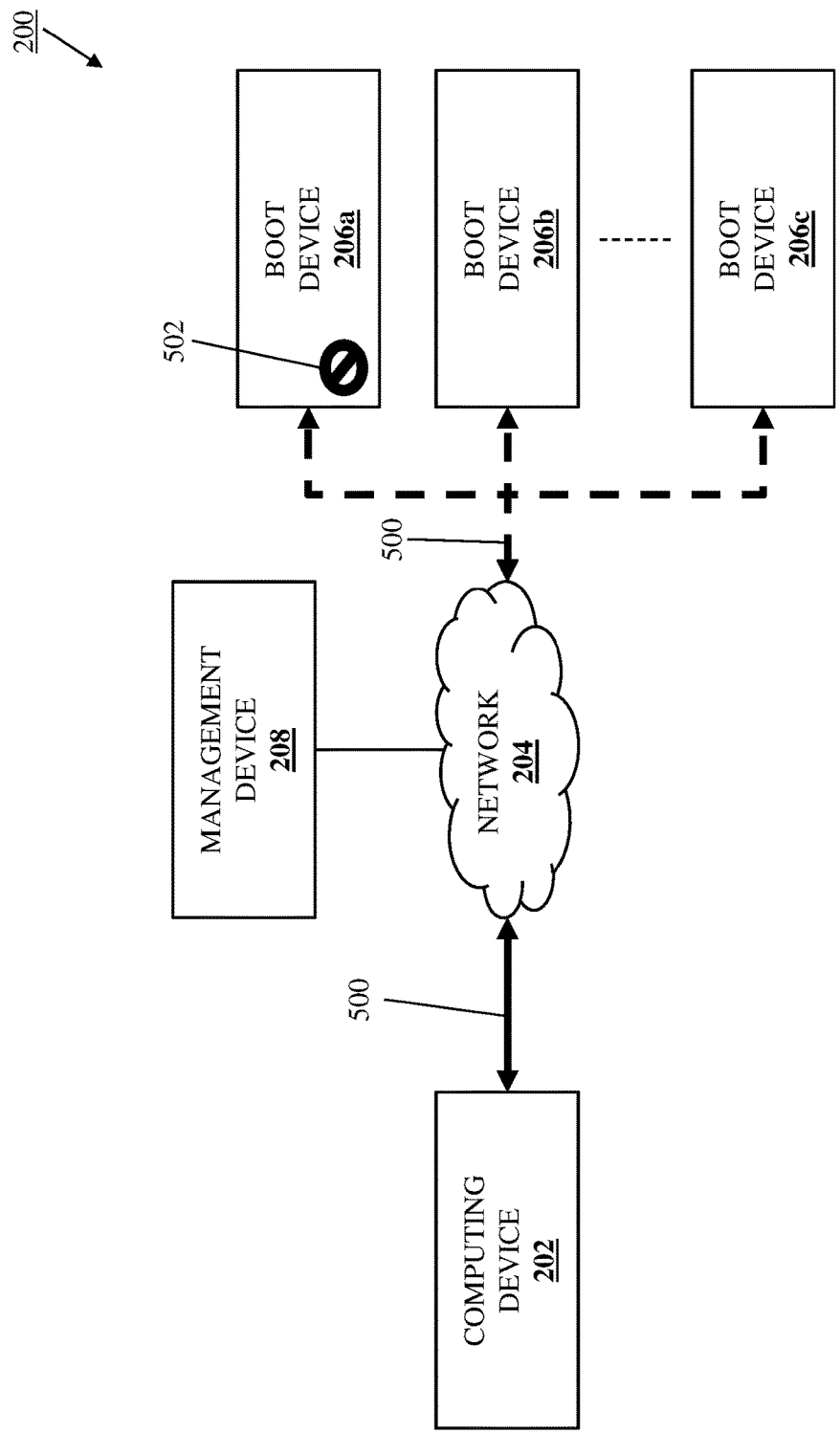
FIG. 5B is a schematic view illustrating an embodiment of the operation of the networked system of FIG. 2 during the method of FIG. 4.

The method 400 then proceeds to block 404 where an initialization subsystem in the computing device performs initial network-level connection operations. With reference to FIGS. 5A and 5B, in an embodiment of block 404 and as part of the initialization of the computing device 202/300 that begins at block 402, the initialization engine 302 in the computing device 202/300 may perform network-level connection operations 500 that may include a first attempt to connect to any of the boot device(s) 206a-206c via its communication system 308 and the network 204 following the beginning of the initialization of the computing device 202/300 at block 402 (with the optionality of the attempt to connect to any of the boot devices 206a-206c indicated by the dashed lined in FIG. 5B). As will be appreciated by one of skill in the art in possession of the present disclosure, the initialization engine 304 and/or the computing device 202/300 may have been previously configured (e.g., by a user) with network-level connection information (e.g., in the initialization database 306) about any of the boot devices 206a-206c that should be used during the initialization operations for the computing device 202/300, and thus the network-level connection operations 500 may include accessing the initialization database 306 and retrieving that network-level connection information as illustrated for use in attempting to connect to any of the boot device(s) 206a-206c at block 404.

In some of the examples provided below, the network-level connection operations 500 performed by the initialization engine 302 in the computing device 202/300 include retrieving the network-level connection information for the boot device 206a and using that network-level connection information to attempt to connect to the boot device 206a. However, as illustrated in FIG. 5B, in these examples the boot device 206a is not available (as illustrated by the element 502 in FIG. 5B) due to, for example, a boot device service (e.g., an iSCSI storage device service in an iSCSI storage device that provides the boot device 206a, an NVMe-OF storage device service in an NVMe-oF storage device that provides the boot device 206a, etc.) being offline, disabled, and/or otherwise unavailable during the network-level connection operations 500.

However, while specific initial network-level connection operations and specific reasons for boot device unavailability during those initial network-level connection operations have been described, one of skill in the art in possession of the present disclosure will appreciate how other initial network-level connection operations and/or other reasons for boot device unavailability during those initial network-level connection operations will fall within the scope of the present disclosure as well. Furthermore, as discussed in further detail below, in addition to the benefits associated with boot devices that configured as boot device options for the computing device 202/300 but that are offline or disabled during initial network-level connection operations, the teachings of the present disclosure also provide benefits if a boot device becomes available following the initial network-level connection operations due to, for example, a reconfiguration of initialization/boot device options by a user of the computing device 202/300 to include that boot device. Further still, while not illustrated or described in detail, one of skill in the art in possession of the present disclosure will appreciate how some embodiments of the present disclosure may configure the initialization engine 304 and/or computing device 202/300 with "local" boot device(s) as its boot device options (e.g., boot devices included in the chassis 302 of the computing device 202/300), and how those local boot devices may be identified during the initialization of the computing device 202/300 while remaining within the scope of the present disclosure as well.

The method 400 then proceeds to decision block 406 where it is determined whether an instruction has been received to enter a boot menu. In an embodiment, at decision block 406 and as part of the initialization of the computing device 202/300 that began at block 402, the initialization engine 304 in the computing device 202/300 may monitor to determine whether an instruction has been received to enter a boot menu. As will be appreciated by one of skill in the art in possession of the present disclosure, in some examples the initial network-level connection operations 500 performed as part of the initialization of the computing device 202/300 may not result in a connection to any of the boot devices 206a-206c (and may not identify any local boot device(s) configured as boot device options for the initialization engine 304/computing device 202/300, if present) and, in response, the initialization engine 304 may provide a boot menu entering screen for display to a user that allows the user to provide an instruction to enter a boot menu (e.g., a boot menu entering screen that notes that no boot devices have been connected to (or identified), identifies a key (e.g., an "F11" key) that may be selected to enter the boot menu, and/or includes any other boot menu entering screen information that would be apparent to one of skill in the art in possession of the present disclosure).

In other examples, the initial network-level connection operations 500 performed as part of the initialization of the computing device 202/300 may or may not result in a connection to one or more of the boot devices 206b-206c (and/or may identify any local boot device(s) configured as boot device options for the initialization engine 304/computing device 202/300, if present). Regardless of the connection to boot device(s), at some time during the initialization operations, the user may select a key (e.g., an "F11" key) that is configured to provide access to the boot menu. As such, at decision block 406, the initialization engine 304 in the computing device 202/300 monitor for the instruction to enter the boot menu from the user. However, while a few examples of the provisioning of an instruction to enter a boot menu have been provided, one of skill in the art in possession of the present disclosure will appreciate how the initialization engine in a computing device may receive an instruction to enter a boot menu in other manners that will fall within the scope of the present disclosure as well.

If, at decision block 406, it is determined that no instruction has been received to enter the boot menu, the method 400 proceeds to block 408 where the computing device completes initialization. In an embodiment, at block 408, the initialization engine 304 in the computing device 202/300 may complete the initialization of the computing device 202/300 using, for example, initialization/boot information included on a boot device to which it connected (or identified in the case of a local boot device) during the initialization operations described above. As will be appreciated by one of skill in the art in possession of the present disclosure, the completion of the initialization of the computing device 202/300 may allow the computing device 202/300 to begin runtime operations in which an operating system in the computing device 202/300 takes control of the computing device 202/300. Furthermore, one of skill in the art in possession of the present disclosure will appreciate how, in some situations, no instruction will be received to enter the boot menu and no boot devices will have been connected to and/or identified during initialization of the computing device 202/300 (e.g., a user of the management device 208 may select some non-boot-menu option on the boot menu entering screen described above), and those situations may be dealt with using any of a variety of conventional techniques that would be apparent to one of skill in the art in possession of the present disclosure.

Figure 6B:
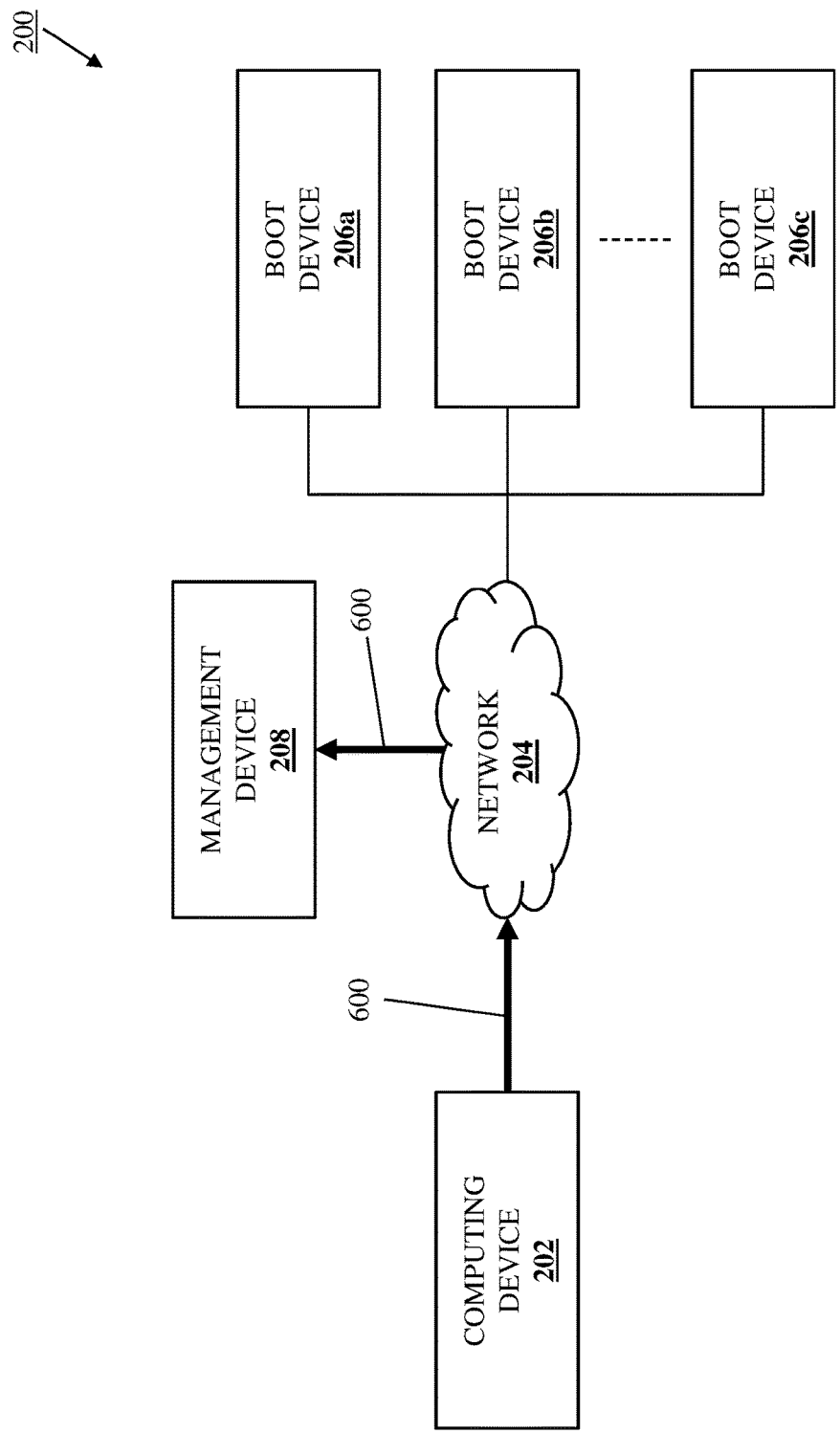
FIG. 6B is a schematic view illustrating an embodiment of the operation of the networked system of FIG. 2 during the method of FIG. 4.
Figure 7A:
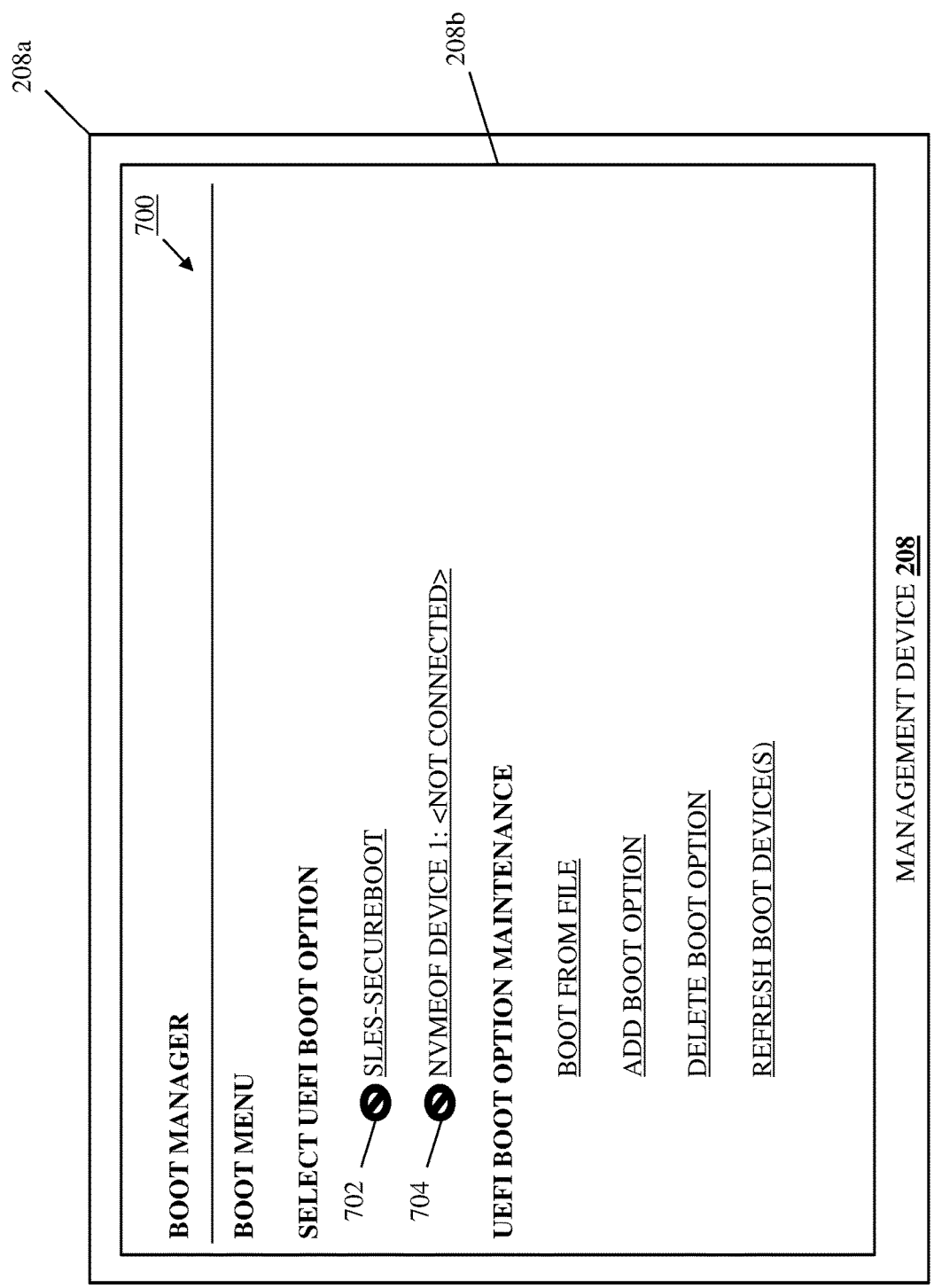
FIG. 7A is a schematic view illustrating an embodiment of the operation of a management device in the networked system of FIG. 2 during the method of FIG. 4.
Figure 8A:
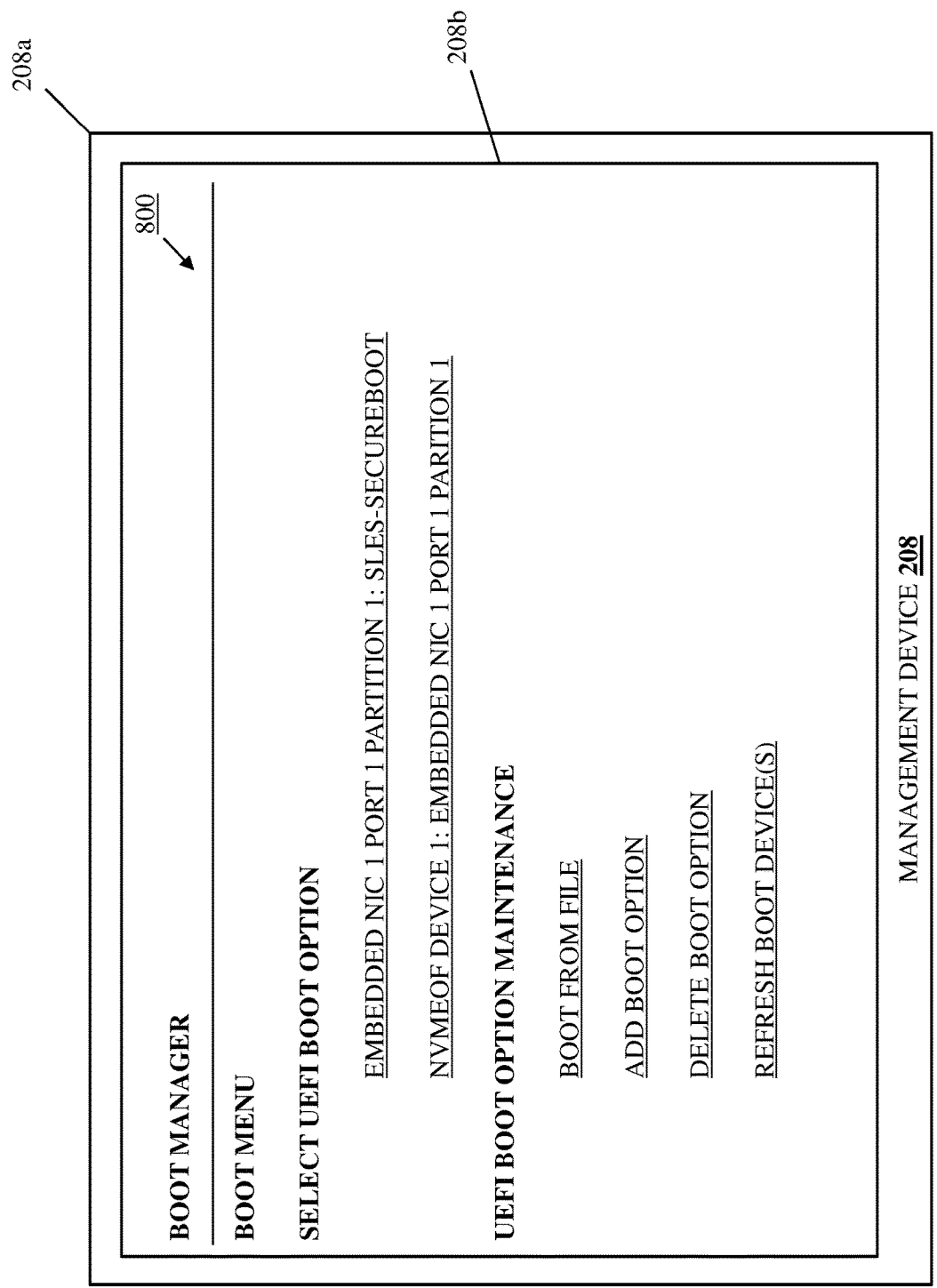
FIG. 8A is a schematic view illustrating an embodiment of the operation of a management device in the networked system of FIG. 2 during the method of FIG. 4.

If at decision block 406, it is determined that an instruction has been received to enter the boot menu, the method 400 proceeds to decision block 410 where it is determined whether a boot device connection refresh should be performed. With reference to FIGS. 6A and 6B, in an embodiment of decision block 406 and in response to receiving the instruction to enter the boot menu, the initialization engine 304 in the computing device 202/300 may perform boot menu provisioning operations 600 to provide a boot menu via its communication system 308 and through the network 204 for display on the management device 208. With reference to FIGS. 7A and 8A, the management device 208 is illustrated as including a chassis 208a having a display device 208b, with the display device 208b displaying a specific example of boot menu screens 700 and 800 in FIGS. 7A and 8A, respectively, that may be included as part of the boot menu provided for display on the management device 208. As will be appreciated by one of skill in the art in possession of the present disclosure, in some examples the boot menu screens 700 and 800 may be accessed in the boot menu after one or more previous boot menu screens. For example, the one or more previous boot menu screens included in the boot menu provided for display on the management device 208 may include graphical elements that may be selected by the user to access the boot menu screens 700 and 800 illustrated in FIGS. 7A and 8A, respectively.

In some examples, and as can be seen in FIG. 7A, the boot menu screen 700 may provide a "BOOT MANAGER"/"BOOT MENU" that includes a "SELECT UEFI BOOT OPTION" section that, in the illustrated example, identifies the unavailability of a "SLES-SECUREBOOT" boot device option (as indicated by element 702 in FIG. 7A), and that identifies the unavailability of a "NVMEOF DEVICE 1: <NOT CONNECTED>" boot device option (as indicated by element 704 in FIG. 7A). For example, the unavailable boot device options may result from the inability to connect to the boot devices identified by those boot device options during the initial network-level connection operations discussed above. As will be appreciated by one of skill in the art in possession of the present disclosure, the elements 702 and 704 identifying the unavailability of the boot device options in FIG. 7A may be replaced by a "greying out" of those boot device options, and/or may be provided by any other unavailability identifiers that would be apparent to one of skill in the art in possession of the present disclosure. In addition, the "BOOT MANAGER"/"BOOT MENU" on the boot menu screen 700 also includes a "UEFI BOOT OPTION MAINTENANCE" section that includes a "BOOT FROM FILE" element, an "ADD BOOT OPTION" element, a "DELETE BOOT OPTION" element, and a "REFRESH BOOT DEVICE(S)" element.

As discussed in further detail below, the "REFRESH BOOT DEVICE(S)" element in the "UEFI BOOT OPTION MAINTENANCE" section of the "BOOT MANAGER"/"BOOT MENU" on the boot menu screen 700 is configured for selection by a user of the management device 208 to "refresh" any connections to boot device options (e.g., the unavailable boot device options illustrated in FIG. 7A) for the computing device 202/300. As such, in an embodiment of decision block 410, the initialization engine 304 in the computing device 202/300 may monitor for the selection of the "REFRESH BOOT DEVICE(S)" element in the "UEFI BOOT OPTION MAINTENANCE" section of the "BOOT MANAGER"/"BOOT MENU" on the boot menu screen 700. However, while a specific technique for instructing the performance of the boot device connection refresh of the present disclosure has been illustrated and described, one of skill in the art in possession of the present disclosure will appreciate how other techniques for instructing the performance of the boot device connection refresh of the present disclosure will fall within the scope of the present disclosure as well.

In other examples, and as can be seen in FIG. 8A, the boot menu screen 800 may provide the "BOOT MANAGER"/"BOOT MENU" that includes the "SELECT UEFI BOOT OPTION" section that, in the illustrated example, identifies the availability of an "EMBEDDED NIC 1 PORT 1 PARITION 1: SLES-SECUREBOOT" boot device, and that identifies the availability of an "NVMEOF DEVICE 1: EMBEDDED NIC 1 PORT 1 PARTITION 1" boot device option. For example, the available boot device options may result from the ability to connect to the boot devices identified by those boot device options during the initial network-level connection operations discussed above. In addition, the "BOOT MANAGER"/"BOOT MENU" on the boot menu screen 800 also includes the "UEFI BOOT OPTION MAINTENANCE" section that includes the "BOOT FROM FILE" element, the "ADD BOOT OPTION" element, the "DELETE BOOT OPTION" element, and the "REFRESH BOOT DEVICE(S)" element.

Figure 8B:
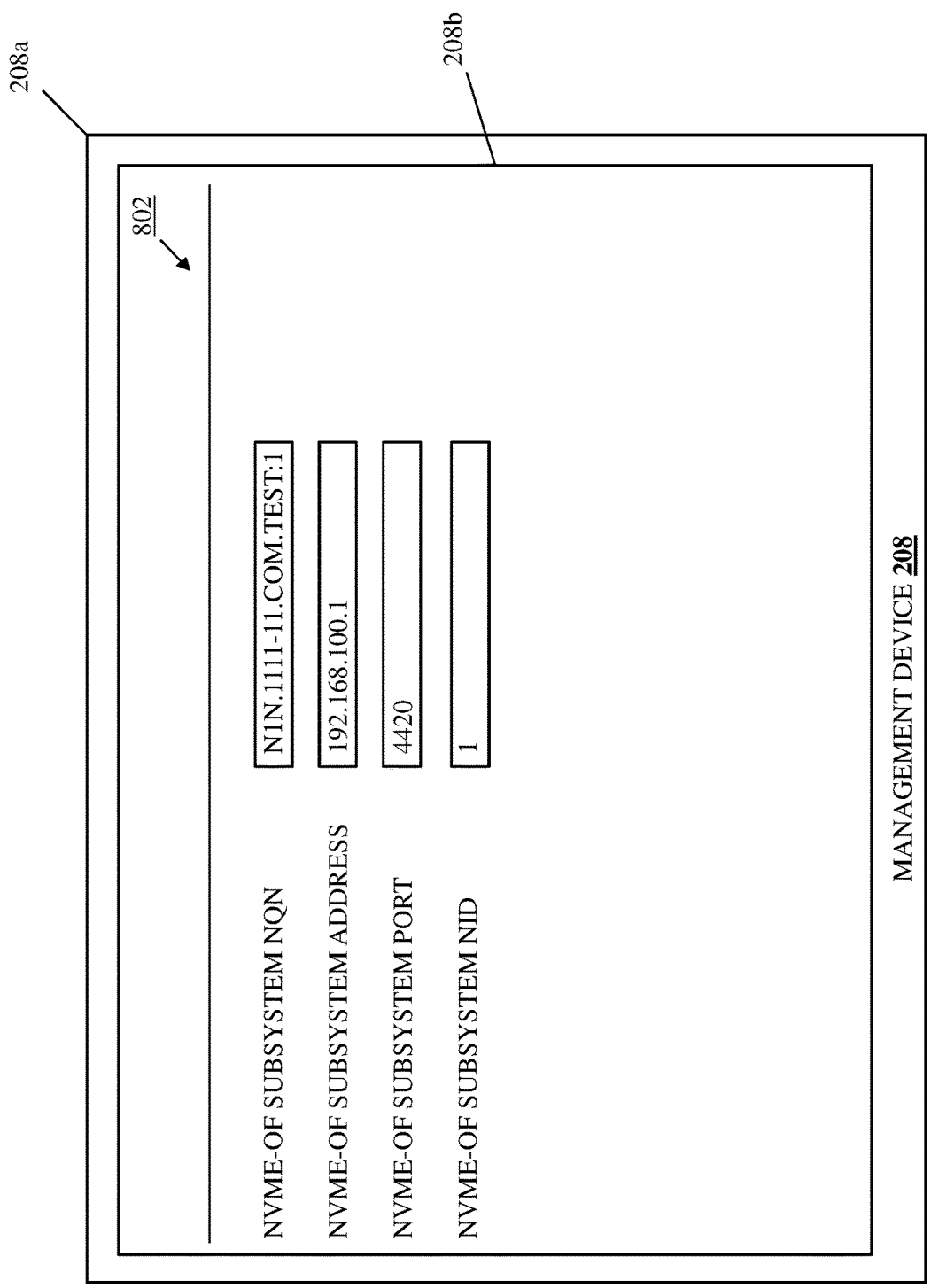
FIG. 8B is a schematic view illustrating an embodiment of the operation of a management device in the networked system of FIG. 2 during the method of FIG. 4.

In an embodiment, a user of the management device 208 may select the "NVMEOF DEVICE 1: EMBEDDED NIC 1 PORT 1 PARTITION 1" boot device option to reconfigure that "NVMEOF DEVICE 1: EMBEDDED NIC 1 PORT 1 PARTITION 1" boot device option to a different boot device (e.g., from a first NVMe-OF storage device to a second NVMe-OF storage device in the illustrated example). For example, FIG. 8B illustrates a boot menu screen 802 that allows the user of the management device 208 to reconfigure the "NVMEOF DEVICE 1: EMBEDDED NIC 1 PORT 1 PARTITION 1" boot device option by, for example, changing NVMe-oF storage device settings to a different NVMe-OF storage device provider by providing a different Non-Qualified Name (NQN), address, port, and Network Identifier (NID) for that NVMe-oF storage device provider, which in the example below reconfigures the "NVMEOF DEVICE 1: EMBEDDED NIC 1 PORT 1 PARTITION 1" boot device option to utilize the boot device 206a.

As such, in an embodiment of decision block 410, the initialization engine 304 in the computing device 202/300 may monitor for the reconfiguration of a boot device option in the "SELECT UEFI BOOT OPTION" section of the "BOOT MANAGER"/"BOOT MENU" on the boot menu screen 800. However, while a specific technique for identifying that the boot device connection refresh of the present disclosure should be performed has been illustrated and described, one of skill in the art in possession of the present disclosure will appreciate how other techniques for determining that the boot device connection refresh of the present disclosure should be performed will fall within the scope of the present disclosure as well.

If, at decision block 410, it is determined that a boot device connection refresh should be performed, the method 400 then proceeds to block 412 where the initialization subsystem performs UEFI-level reconnection operations. In some embodiments, at decision block 410 and as discussed above, the initialization engine 304 in the computing device 202/300 may determine that a boot device connection refresh should be performed in response to detecting the selection by a user of the "REFRESH BOOT DEVICE(S)" element in the "UEFI BOOT OPTION MAINTENANCE" section of the "BOOT MANAGER"/"BOOT MENU" on the boot menu screen 700. In other embodiments, at decision block 410 and as discussed above, the initialization engine 304 in the computing device 202/300 may determine that a boot device connection refresh should be performed in response to detecting the reconfiguration of a boot device option in the "SELECT UEFI BOOT OPTION" section of the "BOOT MANAGER"/"BOOT MENU" on the boot menu screen 800. As such, boot device connection refreshes performed in response to the reconfiguration of a boot device option may be performed "automatically" by the initialization engine 304 and without explicit instruction by a user of the management device 208 (e.g., other than the reconfiguration of the boot device option by the user as described above). However, while two specific boot device connection refresh triggers have been illustrated and described, one of skill in the art in possession of the present disclosure will appreciate how the boot device connection refresh may be triggered based on other factors that will fall within the scope of the present disclosure as well.

In an embodiment, at block 412 and in response to determining that the boot device connection refresh should be performed at decision block 410, the initialization engine 304 in the computing device 202/300 may perform UEFI-level reconnection operations that may include disconnecting UEFI drivers from corresponding devices (e.g., disconnecting UEFI drivers from the corresponding UEFI services provided by those devices), and then connecting UEFI drivers to corresponding devices (e.g., connecting UEFI drivers to corresponding UEFI services provided by those devices). For example, in embodiments including Fibre Channel storage devices that support Boot From Storage Area Network (SAN) functionality, at block 412 storage pass-through UEFI drivers (e.g., "extScsiPassthru" drivers or "NvmePassthru" drivers) may be disconnected from their corresponding Fibre Channel storage devices, and then reconnected to those corresponding Fibre Channel storage devices. However, while particular examples of UEFI-level reconnection operations have been described, one of skill in the art in possession of the present disclosure will appreciate how other UEFI-level reconnection operations may be performed while remaining within the scope of the present disclosure as well.

Figure 9B:
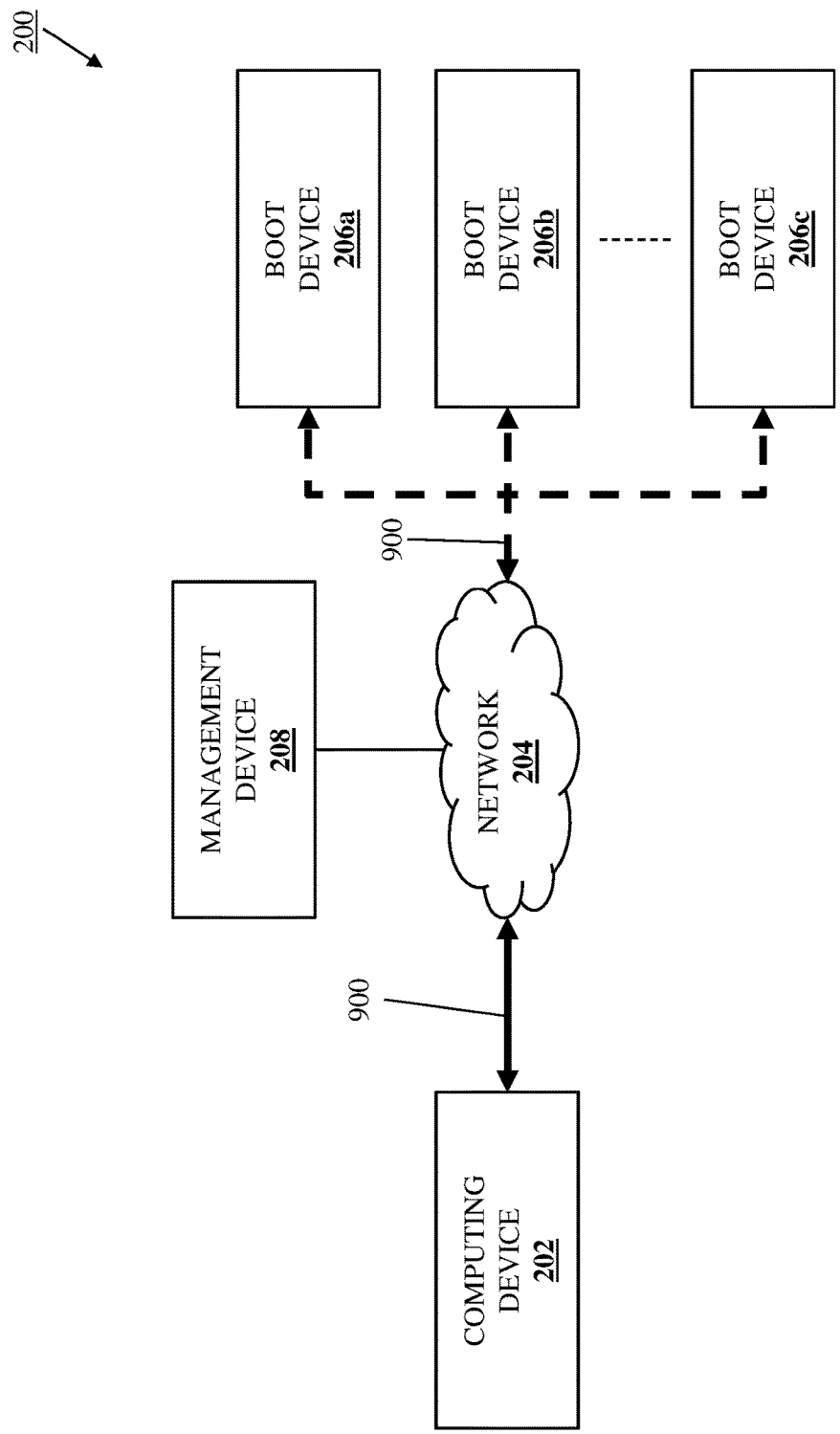
FIG. 9B is a schematic view illustrating an embodiment of the operation of the networked system of FIG. 2 during the method of FIG. 4.

The method 400 then proceeds to block 414 where the initialization subsystem performs subsequent network-level connection operations. With reference to FIGS. 9A and 9B, in an embodiment of block 414 and as part of the boot device connection refresh, the initialization engine 302 in the computing device 202/300 may perform network-level connection operations 900 that may include a second attempt to connect to any of the boot device(s) 206a-206c via its communication system 308 and the network 204 following the beginning of the initialization of the computing device 202/300 at block 402 (with the optionality of the attempt to connect to any of the boot devices 206a-206c indicated by the dashed lined in FIG. 9B). As discussed above, the initialization engine 304 and/or the computing device 202/300 may have been previously configured (e.g., by a user) with network-level connection information (e.g., in the initialization database 306) about any of the boot devices 206a-206c that should be used during the initialization operations for the computing device 202/300, and thus the network-level connection operations 900 may include accessing the initialization database 306 and retrieving that network-level connection information as illustrated for use in attempting to connect to any of the boot device(s) 206a-206c at block 414. As such, in some embodiments the subsequent network-level connection operations performed at any iteration of block 414 may be substantially similar to the initial network-level connection operations performed at block 404.

Continuing with the specific example provided above in which the boot device 206a was initially unavailable, the network-level connection operations 900 performed by the initialization engine 302 in the computing device 202/300 include retrieving the network-level connection information for the boot device 206a and using that network-level connection information to attempt to connect to the boot device 206a. As illustrated in FIG. 9B, in this example the boot device 206a has become available subsequent to the initial network-level connection operations 500 performed at block 404 (as illustrated by the lack of the element 502 in FIG. 5B) due to, for example, a boot device service (e.g., an iSCSI storage device service in an iSCSI storage device that provides the boot device 206a, an NVMe-OF storage device service in an NVMe-oF storage device that provides the boot device 206a, etc.) coming online, being enabled, and/or otherwise become available subsequent to the network-level connection operations.

Continuing with the specific example provided above in which the boot device options for the initialization engine 304 and/or the computing device 200 were reconfigured to include the boot device 206a following the initial network-level connection operations 500, the network-level connection operations 900 performed by the initialization engine 302 in the computing device 202/300 include retrieving the network-level connection information for the boot device 206a and using that network-level connection information to attempt to connect to the boot device 206a. As described above, in this example the boot device 206a has become available subsequent to the initial network-level connection operations performed at block 404 (as illustrated by the lack of the element 502 in FIG. 5B) due to the user of the management device 208 reconfiguring a boot device option in the initialization engine 304 and/or the computing device 202/300 to utilize the boot device 206a. However, while two specific examples have been described, one of skill in the art in possession of the present disclosure will appreciate how subsequent network-level connection operations may be performed in a variety of manners as part of the initialization of the computing device 202/300 that began at block 402 (i.e., without rebooting the computing device 202/300) in order to connect to boot devices that were not available during initial network-level connection operations while remaining within the scope of the present disclosure as well.

Figure 7B:
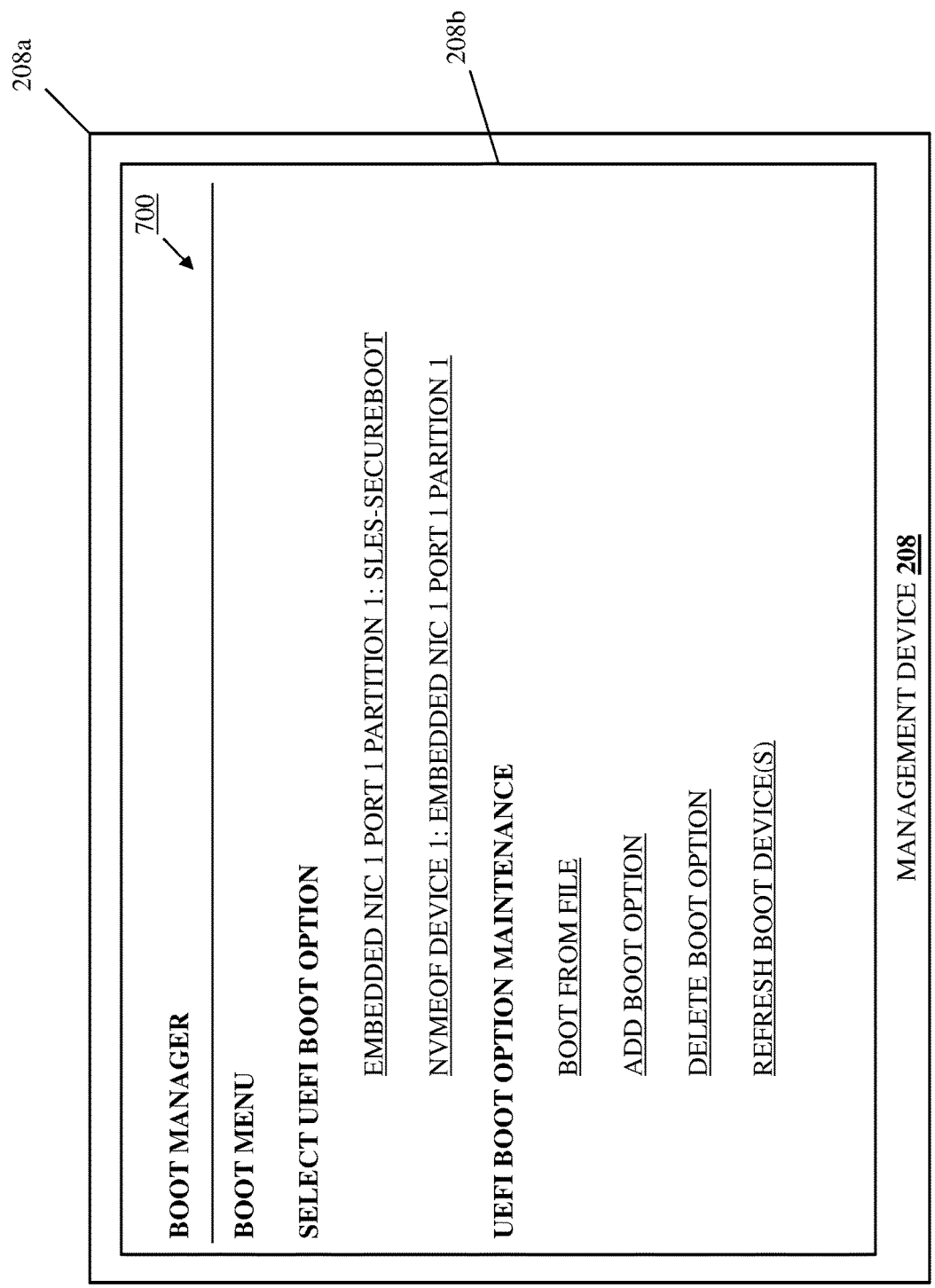
FIG. 7B is a schematic view illustrating an embodiment of the operation of a management device in the networked system of FIG. 2 during the method of FIG. 4.

The method 400 then proceeds to block 416 where the initialization subsystem enumerates boot device option(s) for completing initialization. In an embodiment, at block 416, the initialization engine 304 in the computing device 202/300 may enumerate any boot device option(s) associated with connected, identified, and/or otherwise available boot devices. For example, with reference to FIG. 7B and following the network-level connection operations 900, the enumeration of the boot device options at block 416 may result in the boot menu screen 700 providing the "BOOT MANAGER"/"BOOT MENU" that includes the "SELECT UEFI BOOT OPTION" section that, in the illustrated example, identifies the availability of a "EMBEDDED NIC 1 PORT 1 PARTITION 1: SLES-SECUREBOOT" boot device option, and identifies the availability of a "NVMEOF DEVICE 1: EMBEDDED NIC 1 PORT 1 PARTITION 1" boot device option (i.e., the boot device option associated with the boot device 206a that become available subsequent to the initial network-level connection operations described above). Similarly, with reference back to FIG. 8A and following the network-level connection operations 900, the enumeration of the boot device options at block 416 may result in the boot menu screen 800 providing the "BOOT MANAGER"/"BOOT MENU" that includes the "SELECT UEFI BOOT OPTION" section that, in the illustrated example, identifies the availability of a "EMBEDDED NIC 1 PORT 1 PARTITIN 1: SLES-SECUREBOOT" boot device option, and identifies the availability of a "NVMEOF DEVICE 1: EMBEDDED NIC 1 PORT 1 PARTITION 1" boot device option, but with the "NVMEOF DEVICE 1: EMBEDDED NIC 1 PORT 1 PARTITION 1" boot device option now directed to the boot device 206a due to the reconfiguration described above.

Following block 416, or if it is determined that no boot device connection refresh should be performed at decision block 410, the method 400 proceeds to decision block 418 where it is determined whether a boot device has been selected for initialization. In an embodiment, at decision block 418, the initialization engine 304 in the computing device 202/300 may monitor for a selection by a user of the management device 208 of a boot device for initialization via the boot menu described above. If, at decision block 418, it is determined that no boot device has been selected for initialization, the method 400 returns to decision block 410. As such, the method 400 may loop such that, while in the boot menu, the initialization engine 304 in the computing device 202/300 waits for a boot device to be selected for initialization, while performing the boot device connection refresh of the present disclosure when instructed or when boot device options are reconfigured, until a boot device is selected for initialization.

If, at decision block 418, it is determined that a boot device has been selected for initialization, the method 400 proceeds to block 408. As such, in the event the user of the management device 208 selects a boot device (e.g., the boot device 206a that was connected to as a result of the subsequent network-level connection operations at block 414) for initialization, the initialization engine 304 in the computing device 202/300 may complete initialization of the computing device 202/300 using that boot device substantially as described above with reference to FIG. 408. To provide a specific example, in embodiments in which boot device options for the computing device 202 were reconfigured from a first storage device that included a first operating system (e.g., a SUSE operating system) to a second storage device that includes a second operating system (e.g., an UBUNTU operating system), the completion of the initialization of the computing device 202/300 may include installing that second operating system from that second storage device, and entering runtime operations in which that second operating system controls the computing device 202/300. However, while specific computing device initialization completion operations have been described, one of skill in the art in possession of the present disclosure will appreciate how the computing device 202/300 may complete initialization in a variety of manners that will fall within the scope of the present disclosure as well.

Thus, systems and methods have been described that provide for "refreshing" of the connection between a computing device and a network-connected boot device during initialization of that computing device and without the need for a reboot. For example, the network-connected boot device connection refresh system of the present disclosure may include a computing device that is coupled to a boot device via a network, and that includes an initialization subsystem. As part of an initialization of the computing device, the initialization subsystem performs first network-level connection operations that do not result in a connection to the boot device. If the initialization subsystem then determines that a boot device connection refresh should be performed, it performs Unified Extensible Firmware Interface (UEFI)-level reconnection operations followed by second network-level connection operations that result in a connection to the boot device, and provides the boot device as an option for completing the initialization of the computing device. As such, boot devices that become available to the computing device subsequent to first network-level connection operations performed during initialization of the computing device may be connected to via second network-level connection operations performed during that initialization of the computing device, eliminating the need to reboot the computing device in order to connect to a boot device that was unavailable during initial network-level connection operations, as occurs in conventional computing devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network-connected boot device connection refresh system, comprising:
    a boot device; and
    a computing device that is coupled to the boot device via a network, wherein the computing device includes an initialization subsystem that is configured, during an initialization of the computing device, to:
        perform first network-level connection operations that do not result in a connection to the boot device;
        provide, for display to a user via a user interface, at least one initialization option for the computing device that identifies the boot device as unavailable for completing the initialization of the computing device;
        determine that a boot device connection refresh has been initiated by the user via the user interface;
        perform, in response to determining that the boot device connection refresh has been initiated by the user, Unified Extensible Firmware Interface (UEFI)-level reconnection operations that include disconnecting at least one UEFI driver from a device connected to that UEFI driver, and then reconnecting that UEFI driver to that device;
        perform, in response to performing the UEFI-level reconnection operations, second network-level connection operations that result in a connection to the boot device; and
        provide, for display to the user via the user interface, the at least one initialization option for the computing device that identifies the boot device as available for completing the initialization of the computing device.

2. The system of claim 1, wherein the boot device includes one of an internet Small Computer Systems Interface (iSCSI) storage device or a Non-Volatile Memory express (NVMe) over Fabrics (NVMe-oF) storage device.

3. The system of claim 1, wherein the first network-level connection operations do not result in the connection to the boot device due to the boot device being unavailable during the first network-level connection operations, and wherein the second network-level connection operations result in the connection to the boot device due to the boot device becoming available prior to the second network-level connection operations.

4. The system of claim 3, wherein the initialization subsystem is configured to:
   determine that the boot device connection refresh has been initiated by the user in response to receiving a boot device connection refresh instruction from the user via a management device that is coupled to the computing device and that displays the user interface.

5. The system of claim 1, wherein the first network-level connection operations do not result in the connection to the boot device due to no boot options in the initialization subsystem being configured with the boot device, and wherein the second network-level connection operations result in the connection to the boot device due to a boot option in the initialization subsystem being configured via the user interface by the user with the boot device prior to the second network-level connection operations.

6. The system of claim 5, wherein the initialization subsystem is configured to:
   determine that the boot device connection refresh should be performed in response to the boot option in the initialization subsystem being configured via the user interface by the user with the boot device.

7. An Information Handling System (IHS), comprising:
a processing system; and
a memory system that is coupled to the processing system and that includes instructions that, when executed by the processing system, cause the processing system to provide an initialization engine that is configured to:
   perform, during an initialization of the IHS, first network-level connection operations that do not result in a connection to a boot device;
   provide, for display to a user via a user interface and during the initialization of the IHS, at least one initialization option for the IHS that identifies the boot device as unavailable for completing the initialization of the IHS;
   determine, during the initialization of the IHS, that a boot device connection refresh has been initiated by the user via the user interface;
   perform, in response to determining that the boot device connection refresh has been initiated by the user and during the initialization of the IHS, Unified Extensible Firmware Interface (UEFI)-level reconnection operations that include disconnecting at least one UEFI driver from a device connected to that UEFI driver, and then reconnecting that UEFI driver to that device;
   perform, in response to performing the UEFI-level reconnection operations and during the initialization of the IHS, second network-level connection operations that result in a connection to the boot device; and
   provide, for display to the user via the user interface and during the initialization of the IHS, the at least one initialization option for the computing device that identifies the boot device as available for completing the initialization of the IHS.

8. The IHS of claim 7, wherein the boot device includes one of an internet Small Computer Systems Interface (iSCSI) storage device or a Non-Volatile Memory express (NVMe) over Fabrics (NVMe-oF) storage device.

9. The IHS of claim 7, wherein the first network-level connection operations do not result in the connection to the boot device due to the boot device being unavailable during the first network-level connection operations, and wherein the second network-level connection operations result in the connection to the boot device due to the boot device becoming available prior to the second network-level connection operations.

10. The IHS of claim 9, wherein the initialization engine is configured to:
   determine that the boot device connection refresh has been initiated by the user in response to receiving a boot device connection refresh instruction from the user via a management device that is coupled to the computing device and that displays the user interface.

11. The IHS of claim 7, wherein the first network-level connection operations do not result in the connection to the boot device due to no boot options in the initialization engine being configured with the boot device, and wherein the second network-level connection operations result in the connection to the boot device due to a boot option in the initialization engine being configured via the user interface by the user with the boot device prior to the second network-level connection operations.

12. The IHS of claim 11, wherein the initialization engine is configured to:
   determine that the boot device connection refresh should be performed in response to the boot option in the initialization engine being configured via the user interface by the user with the boot device.

13. The IHS of claim 7, the initialization engine is configured to:
   provide, for display on the user interface that is displayed by a management device that is coupled to the computing device and following the first network-level connection operations, a boot device connection refresh element that is selectable by the user via the user interface using the management device to cause the initialization engine to determine that the boot device connection refresh has been initiated by the user.

14. A method for refreshing the connection of network-connected boot devices for a computing device, comprising:
   performing, by an initialization subsystem during initialization of a computing device, first network-level connection operations that do not result in a connection to a boot device;
   provide, by the initialization subsystem during the initialization of the computing device and for display to a user via a user interface, at least one initialization option for the computing device that identifies the boot device as unavailable for completing the initialization of the computing device;
   determining, by the initialization subsystem during the initialization of the computing device, that a boot device connection refresh has been initiated by the user via the user interface;
   performing, by the initialization subsystem during the initialization of the computing device and in response to determining that the boot device connection refresh has been initiated by the user, Unified Extensible Firmware Interface (UEFI)-level reconnection operations that include disconnecting at least one UEFI driver from a device connected to that UEFI driver, and then reconnecting that UEFI driver to that device;
   performing, by the initialization subsystem during the initialization of the computing device and in response to performing the UEFI-level reconnection operations, second network-level connection operations that result in a connection to the boot device; and providing, by the initialization subsystem during the initialization of the computing device and for display to the user via the user interface, the at least one initialization option for the computing device that identifies the boot device as available for completing the initialization of the computing device.

15. The method of claim 14, wherein the boot device includes one of an internet Small Computer Systems Interface (iSCSI) storage device or a Non-Volatile Memory express (NVMe) over Fabrics (NVMe-oF) storage device.

16. The method of claim 14, wherein the first network-level connection operations do not result in the connection to the boot device due to the boot device being unavailable during the first network-level connection operations, and wherein the second network-level connection operations result in the connection to the boot device due to the boot device becoming available prior to the second network-level connection operations.

17. The method of claim 16, further comprising:
determining, by the initialization subsystem, that the boot device connection refresh has been initiated by the user response to receiving a boot device connection refresh instruction from the user via a management device that is coupled to the computing device and that displays the user interface.

18. The method of claim 14, wherein the first network-level connection operations do not result in the connection to the boot device due to no boot options in the initialization subsystem being configured with the boot device, and wherein the second network-level connection operations result in the connection to the boot device due to a boot option in the initialization subsystem being configured via the user interface by the user with the boot device prior to the second network-level connection operations.

19. The method of claim 18, further comprising:
determining, by the initialization subsystem, that the boot device connection refresh should be performed in response to the boot option in the initialization engine being configured via the user interface by the user with the boot device.

20. The method of claim 14, further comprising:
provide, by the initialization subsystem for display on the user interface that is displayed by a management device that is coupled to the computing device and following the first network-level connection operations, a boot device connection refresh element that is selectable by the user via the user interface using the management device to cause the initialization subsystem to determine that the boot device connection refresh has been initiated by the user.

* * * * *

UNITED STATES PATENT AND TRADEMARK OFFICE
CERTIFICATE OF CORRECTION

| | | |
|---|---|---|
| PATENT NO. | : 12,340,230 B2 | Page 1 of 1 |
| APPLICATION NO. | : 18/137601 | |
| DATED | : June 24, 2025 | |
| INVENTOR(S) | : Shengwei Hsu et al. | |

It is certified that error appears in the above-identified patent and that said Letters Patent is hereby corrected as shown below:

On the Title Page

Item (72), "Taipei (TW)" should read -- Taipei City (TW) --

Item (72), "New Taipei (TW)" should read -- New Taipei City (TW) --

In the Claims

Column 17, Lines 22-23, Claim 17, "by the user response" should read -- by the user in response --

Signed and Sealed this
Twenty-sixth Day of August, 2025

Coke Morgan Stewart
*Acting Director of the United States Patent and Trademark Office*